(12) United States Patent
Hansen (10) Patent No.: US 7,453,817 B1
(45) Date of Patent: Nov. 18, 2008

(54) CENTRAL TRAFFIC CORRELATION SYSTEM

(75) Inventor: Kevin Harry Hansen, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 530 days.

(21) Appl. No.: 11/049,526

(22) Filed: Feb. 1, 2005

(51) Int. Cl.
*G01R 31/08* (2006.01)

(52) U.S. Cl. ........................... 370/242; 370/252

(58) Field of Classification Search .................. None
See application file for complete search history.

(56) References Cited

U.S. PATENT DOCUMENTS

| 6,058,102 | A * | 5/2000 | Drysdale et al. | 370/252 |
|---|---|---|---|---|
| 7,080,141 | B1 * | 7/2006 | Baekelmans et al. | 709/224 |
| 7,293,083 | B1 * | 11/2007 | Ranous et al. | 709/224 |
| 2001/0021176 | A1 * | 9/2001 | Mimura et al. | 370/235 |
| 2004/0109410 | A1 * | 6/2004 | Chase et al. | 370/229 |
| 2004/0192364 | A1 * | 9/2004 | Ranalli et al. | 455/517 |
| 2006/0085536 | A1 * | 4/2006 | Meyer et al. | 709/224 |
| 2007/0133435 | A1 * | 6/2007 | Eneroth et al. | 370/260 |

* cited by examiner

*Primary Examiner*—Phirin Sam (57) ABSTRACT

In an embodiment of the invention, the CTCS is configured to receive a correlation request for a first service session from a client device and process the correlation request to select a first traffic collection system (TCS) and a second TCS. The CTCS also generates a collection request and transmits the collection request for the first service session to the first TCS and the second TCS. The CTCS then receives a first collection response from the first TCS indicating first data for the first service session, and receives a second collection response from the second TCS indicating second data for the first service session. The CTCS then processes the first data and the second data to generate a correlation response and transfers the correlation response to the client device indicating the first and second data.

18 Claims, 5 Drawing Sheets

CENTRAL TRAFFIC CORRELATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to telecommunication technologies, and in particular, to correlating signaling traffic for service sessions in packet service networks.

2. Description of the Prior Art

Recent advances in telecommunication technologies have resulted in a variety of new service offerings. For example, many service providers now offer services over packet-based networks. An example of a new packet based service is Voice over Internet Protocol (VoIP) service. The wireless sector in particular has experienced a rapid increase in service offerings. For example, many wireless service providers now offer VoIP calling, push-to-talk (PTT) service, Internet browsing, data services, and video services, along with traditional voice services. Wireless service providers provide these services using various technologies, such as code division multiple access (CDMA), evolution data only (EVDO), and wireless fidelity (WiFi).

While these new technologies have enhanced the user experience, they have also introduced several new challenges for wireless carriers to overcome. For example, PTT service, which is also sometimes referred to as press-to-talk, is popular among groups of users, such as construction crews and police forces. However, a PTT session failure affects an entire group of users rather than just two users, as is the case during a traditional voice conversation. It is therefore important to service providers to have the ability to trouble shoot an entire PTT session experience.

In the past, trouble shooting session experiences involved monitoring the signaling channels of circuit switched networks. Circuit switched networks have traditionally separated bearer traffic from signaling traffic. For example, Signaling System No. 7 is a signaling protocol whereby signaling traffic is carried over channels distinct from the channels that carry user traffic. In contrast, packet-based networks carry bearer traffic and signaling traffic over the same channels. Thus, it is difficult to trouble shoot session experiences for new services that are provided over new access technologies because the signaling traffic travels across distributed packet channels rather than within a dedicated signaling system.

In one solution in the prior art, service providers place in-band signaling monitoring systems in each region of their networks to monitor traffic for signaling traffic. For example, a network could be logically divided based on geographic boundaries. Each geographic region would therefore have an in-band signaling monitoring system. During a PTT session, several users from several distinct network regions communicate via the network. Signaling is exchanged across the network for call setup and teardown, as well as other purposes. The in-band signaling monitoring systems capture and store the signaling traffic for later analysis.

Assuming a PTT session failure occurs at some point in the session, it would be desirable for the service provider to inquire as to the source of the failure. A technician would be required to query each in-band signaling monitoring system in the entire network. In addition, the technician would be required to intuitively or manually correlate the query responses. Unfortunately, service providers in the prior art do not have the ability to centrally query the various distinct in-band signaling monitoring systems to gather data related to the failed PTT service sessions. Instead, the amount of raw data included in the query responses could overwhelm any attempt by a technician to efficiently and quickly discover the source of the session failure.

SUMMARY OF THE INVENTION

An embodiment of the invention helps solve the above problems and other problems by providing a central traffic correlation system (CTCS) and a method of operating a CTCS for correlating signaling traffic for service sessions in a packet service network. The CTCS provides for centrally and simultaneously gathering session information on a call by call basis regardless of the origin or destination of a session.

In an embodiment of the invention, the CTCS is configured to receive a correlation request for a first service session from a client device and process the correlation request to select a first traffic collection system (TCS) and a second TCS. The CTCS also generates a collection request and transmits the collection request for the first service session to the first TCS and the second TCS. The CTCS then receives a first collection response from the first TCS indicating first data for the first service session, and receives a second collection response from the second TCS indicating second data for the first service session. The CTCS then processes the first data and the second data to generate a correlation response and transfers the correlation response to the client device indicating the first and second data.

In an embodiment of the invention, the first TCS is configured to monitor and store first signaling traffic for a first network region, receive the collection request from the CTCS, process the collection request to retrieve the first data for the first service session from the first signaling traffic, and transmit the first collection response indicating the first data to the CTCS.

In an embodiment of the invention, the second TCS is configured to monitor and store second signaling traffic for a second network region, receive the collection request from the CTCS, process the collection request to retrieve the second data for the first service session from the second signaling traffic, and transmit the second collection response indicating the second data to the CTCS.

In an embodiment of the invention, the first signaling traffic comprises Session Initiation Protocol (SIP) messaging for the first service session.

In an embodiment of the invention, the second signaling traffic comprises Session Initiation Protocol (SIP) messaging for the first service session.

In an embodiment of the invention, the first service session comprises a push-to-talk session.

In an embodiment of the invention, the collection request indicates a group having a plurality of users.

In an embodiment of the invention, the first TCS is configured to process the collection request to retrieve the first data for the first service session from the first signaling traffic based on the group.

In an embodiment of the invention, the first TCS is configured to process the collection request to retrieve the first data for the first service session from the first signaling traffic based on at least a one of the plurality of users.

In an embodiment of the invention, the first data comprises partial message information for the first session and the second data comprises partial message information for the first session and the first data and the second data in combination comprise full message information for the first session.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
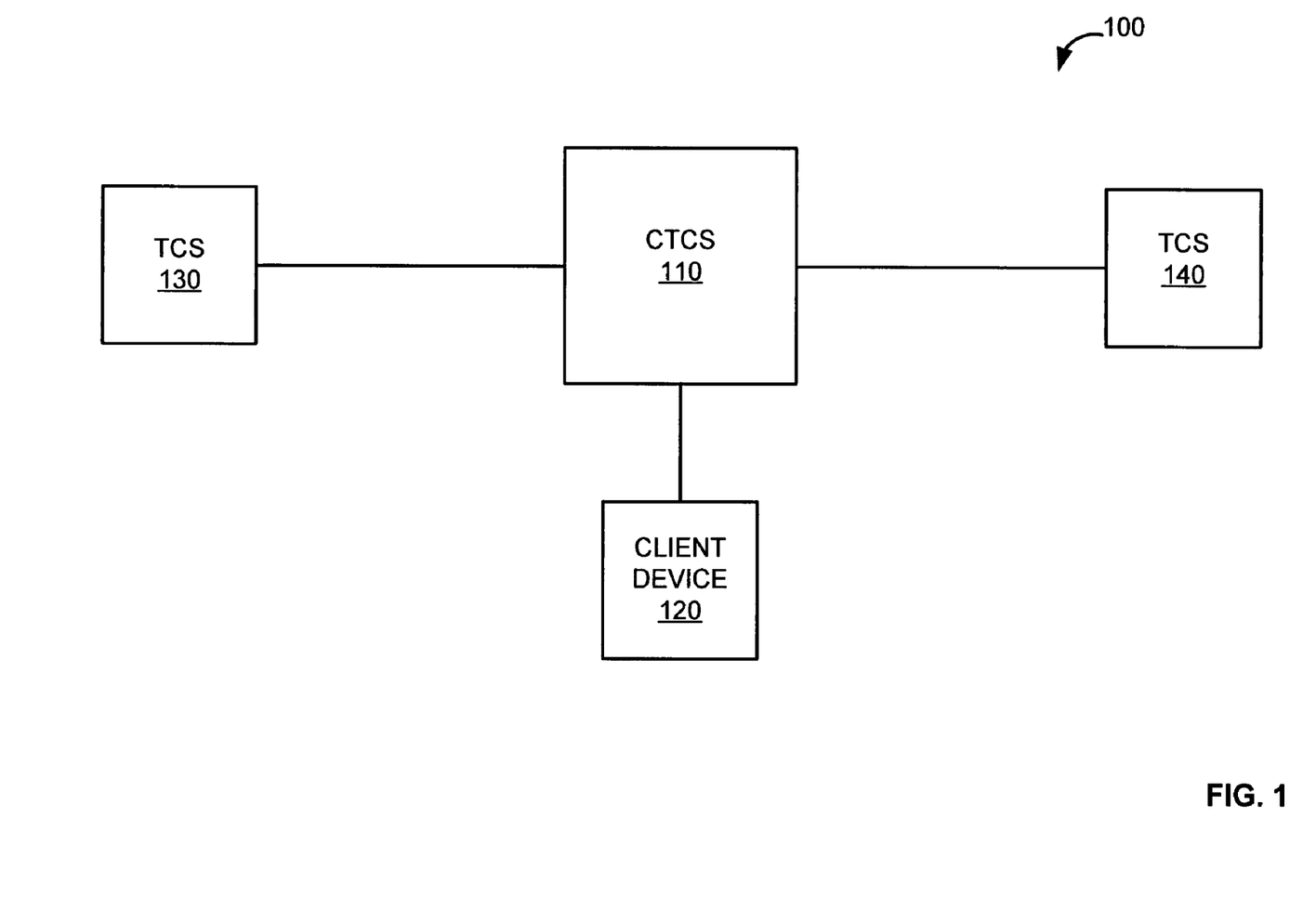
FIG. 1 illustrates a communication network in an embodiment of the invention.
Figure 2:
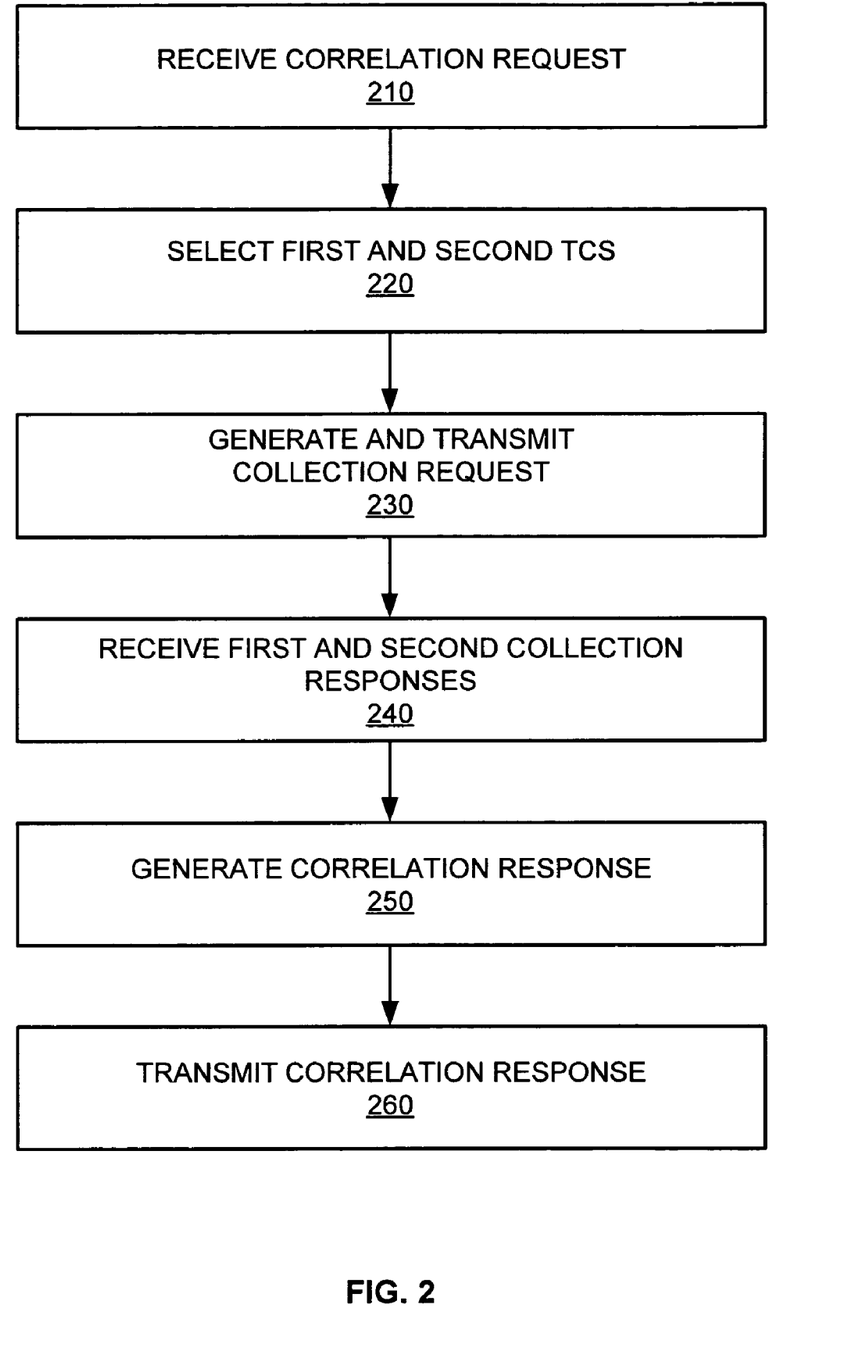
FIG. 2 illustrates the operation of a central traffic correlation system in an embodiment of the invention.

First Embodiment Configuration and Operation—FIGS. 1 and 2

FIG. 1 illustrates communication network 100 in an embodiment of the invention. Communication network 100 includes central traffic correlation system (CTCS) 110, traffic collection system (TCS) 130, TCS 140, and client device 120. TCS 130 is in communication with CTCS 110 over conventional communication links well known in the art, such as fast-Ethernet, as well as other well known links. TCS 140 is also in communication with CTCS 110 over conventional communication links well known in the art. Similarly, client device 120 is in communication with CTCS 110 over conventional communication links well known in the art. Communication network 100 could include additional elements that are not shown for the sake of clarity. For example, communication network 100 could include elements such as network routers, wireless base stations, mobile switching centers (MSCs), and soft switches, as well as additional traffic collection systems. Communication network 100 could also include user devices, such as mobile phones, personal digital assistants (PDAs), pagers, computers, as well as other devices.

FIG. 2 illustrates the operation of CTCS 110 in an embodiment of the invention for correlating signaling traffic for service sessions. To begin, CTCS 110 receives a correlation request for a service session from client device 120 (Step 210). The service session could be, for example, a PTT session among several user devices in communication network 100. CTCS 110 processes the correlation request to select TCS 130 and TCS 140 (Step 220). TCS 130 and 140 could be selected from several other traffic collection systems. In this case, CTCS 110 would process the correlation request to determine which traffic collection systems are relevant to the request.

Upon selection of TCS 130 and TCS 140, CTCS 110 generates a collection request and transmits the collection request to TCS 130 and TCS 140 (Step 230). Next, CTCS 110 receives a collection response from TCS 130 indicating data for the PTT service session (Step 240). CTCS 110 also receives a collection response from TCS 140 indicating additional data for the PTT service session (Step 240). CTCS 110 then processes the data from TCS 130 and the data from TCS 140 to generate a correlation response for client device 120 (Step 250). Lastly, CTCS 110 transfers the correlation response to client device 120 (Step 260). The correlation response indicates the data from TCS 130 and the data from TCS 140.

In another embodiment, TCS 130 could monitor and store signaling traffic for a first region of communication network 100. TCS 130 would then receive the collection request from CTCS 110 and process the collection request to retrieve data for the PTT service session from the stored signaling traffic. TCS 130 would transmit its collection response indicating the PTT data to CTCS 110. TCS 140 could operate in a similar manner as described for TCS 130. An example of signaling traffic for the service session is session initiation protocol (SIP) messaging.

In another embodiment, the collection requests transmitted from CTCS 110 to TCS 130 and TCS 140 could indicate a group of users, such as a PTT user group. TCS 130 could then process the collection request to retrieve data for the PTT service session from the stored signaling traffic based on the group. TCS 130 could also process the collection request to retrieve the data for the PTT service session from the stored signaling traffic based on at least a one of the group of users. TCS 140 could operate in a similar manner as described for TCS 130. Data for the PTT service session collected by TCS 130 could contain partial message information for the session. Similarly, data for the PTT service session collected by TCS 140 could contain partial message information for the session. In this case, the partial message information transmitted from both TCS 130 and 140 in combination could comprise full message information for the session.

Advantageously, communication network 100 allows a service provider to inquire as to the source of a service session failure. Each in-band signaling monitoring system, such as TCS 130 and TCS 140, in the entire network can be centrally queried automatically by CTCS 110 to gather data on failed services sessions. By collecting and correlating service session data, the large amounts of raw data included in the query responses can be quickly and efficiently viewed to discover the source of the session failure.

Figure 3:
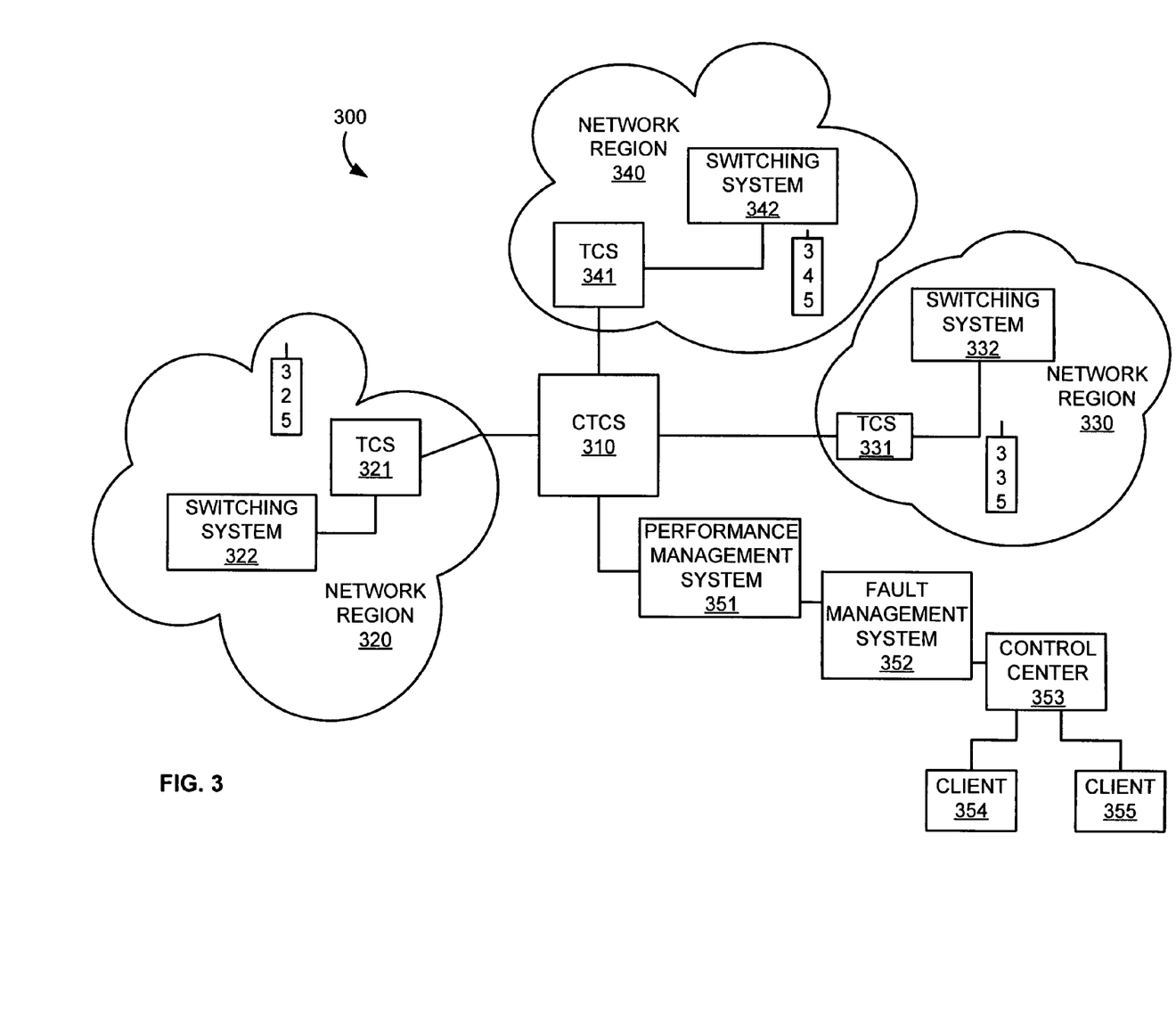
FIG. 3 illustrates a communication network in an embodiment of the invention.
Figure 4:
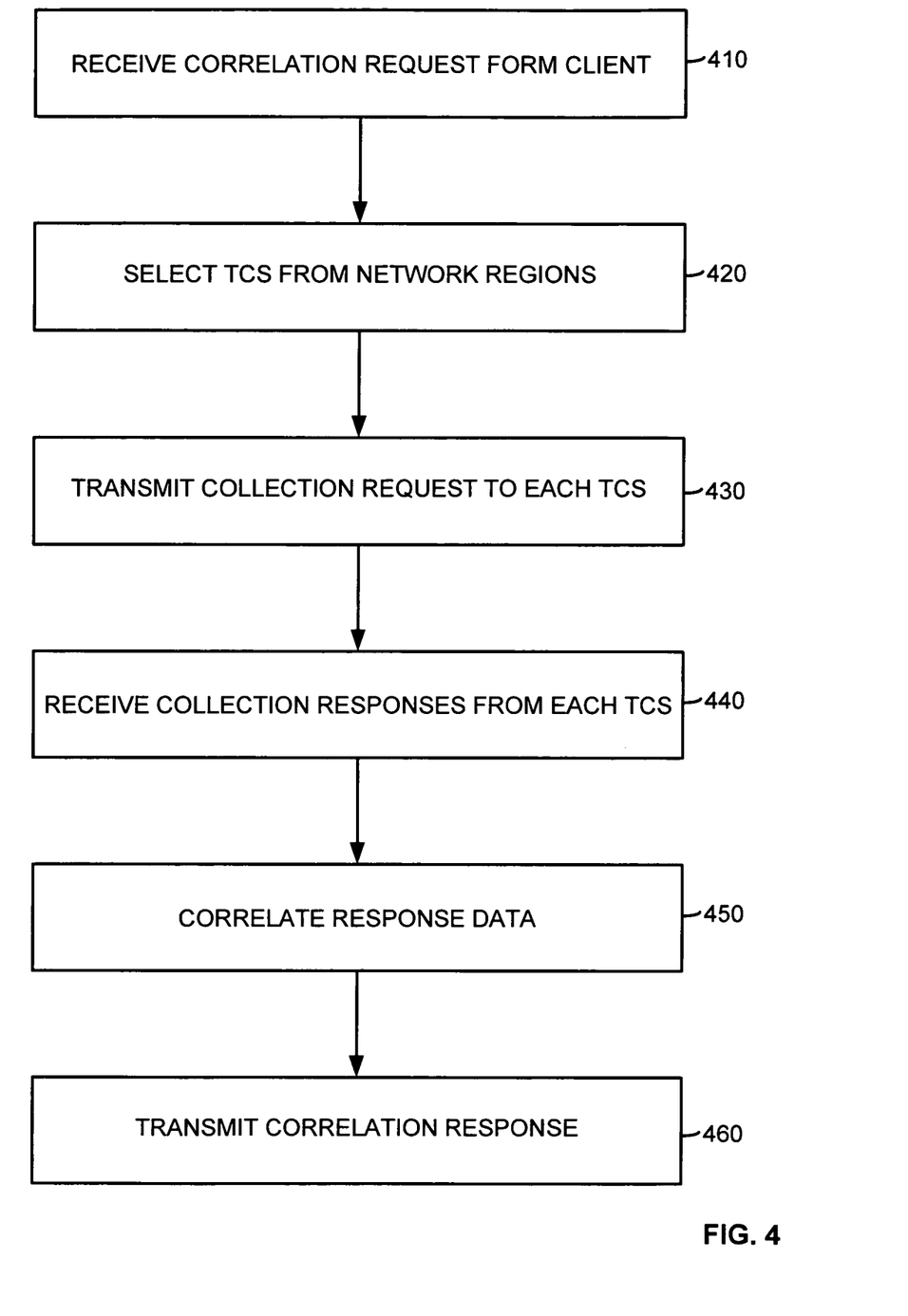
FIG. 4 illustrates the operation of a central traffic correlation system in an embodiment of the invention.

Second Embodiment Configuration and Operation—FIGS. 3-4

FIG. 3 illustrates communication network 300 in an embodiment of the invention. Communication network 300 includes network regions 320, 330, and 340. Communication network 300 also includes central traffic correlation system (CTCS) 310 in communication with elements of network regions 320, 330, and 340 over conventional links well known in the art. CTCS 310 is also in communication with performance management system 351 over conventional links. Performance management system is in communication with fault management system 352. Fault management system 352 is in communication with control center 353. Clients 354 and 355 are in communication with control center 353. An example of a conventional link is fast-Ethernet.

Network region 320 could be, for example, a packet based communication network. Network region 320 includes traffic collection system (TCS) 321, switching system 322, and user devices 325 and 326. Switching system 322 could also be referred to as a soft switch or a media gateway controller. It should be understood that network region 320 also includes a conventional routing system, which is not shown for purposes of clarity. Mobile devices 325 and 326 are in communication with switching system 322 using a packet signaling protocol, such as SIP, as well as other signaling protocols. Traffic is carried over the routing system to and from devices 325 and 326 and switching system 322. Other network elements are not shown for purposes of clarity, such as edge proxy servers and gateways, as well as other elements. TCS 321 is in communication with switching system 322 and monitors signaling traffic that passes through switching system 322. For example, TCS 321 can view SIP signaling messages transmitted by user device 325.

Network region 330 could be, for example, a packet based communication network. Network region 330 includes traffic collection system (TCS) 331, switching system 332, and user devices 335 and 336. Switching system 332 could also be referred to as a soft switch or a media gateway controller. It should be understood that network region 330 also includes a conventional routing system, which is not shown for purposes of clarity. Mobile devices 335 and 336 are in communication with switching system 332 using a packet signaling protocol, such as SIP, as well as other signaling protocols. Traffic is carried over the routing system to and from devices 335 and 336 and switching system 332. Other network elements are not shown for purposes of clarity, such as edge proxy servers and gateways, as well as other elements. TCS 331 is in communication with switching system 332 and monitors signaling traffic that passes through switching system 332. For example, TCS 331 can view SIP signaling messages transmitted by user device 335.

Network region 340 could be, for example, a packet based communication network. Network region 340 includes traffic collection system (TCS) 341, switching system 342, and user devices 345 and 346. Switching system 342 could also be referred to as a soft switch or a media gateway controller. It should be understood that network region 340 also includes a conventional routing system, which is not shown for purposes of clarity. Mobile devices 345 and 346 are in communication with switching system 342 using a packet signaling protocol, such as SIP, as well as other signaling protocols. Traffic is carried over the routing system to and from devices 345 and 346 and switching system 342. Other network elements are not shown for purposes of clarity, such as edge proxy servers and gateways, as well as other elements. TCS 341 is in communication with switching system 342 and monitors signaling traffic that passes through switching system 342. For example, TCS 341 can view SIP signaling messages transmitted by user device 345.

CTCS 310, in combination with performance management system 351, fault management system 352, and control center 353, comprises an Operations Service and Support Network (OSSN) for communication network 300. Clients 354 and 355 are provided direct access to call and service detail records via an IP/TCP interface connected to the OSSN. Personnel will be able to view, trace, and troubleshoot A/10/A11, IOTA, PDSN Redirect, SIP and other messages that can be captured within the data streams. In addition, communication network 300 will integrate existing trouble shooting tools, such as Core Mobility and Casabyte probes that simulate customer experiences by providing customer call simulations across the network.

Clients 354 and 355 interface over conventional communication links with CTCS 310 to correlate signaling traffic gathered from the regions of communication network 300. Clients 354 and 355 could be device such as work stations and wireless computing devices, as well as other types of devices. Users, such as network engineering personnel, interface with CTCS 310 utilizing clients 354 and 355. As is well known in the art, control center 353 provides a central control location for monitoring the health and performance of communication network 300. Fault management system 352 is configured to monitor the physical operation of the network. Performance management system 351 monitors performance statistics, such as bandwidth utilization, as well as other performance metrics.

CTCS 310 provides a complete end to end of view of service session failures. Such a view also provides cause codes and associated signaling messages to pinpoint the location of failures in the network. CTCS 310 also provides the ability to trouble shoot SIP message routing from edge proxy to edge proxy among national service platforms in a network supporting PTT. In addition, CTCS 310 provides a standard service quality monitoring model for in-band signaling troubleshooting, such as call tracing across a network. This allows a service provider to have a better understanding of message routing to manage the capacity of PTT services and their associated next generation voice network platforms. Load sharing among network elements is also improved. Trouble shooting by personal and corporate group lists for PTT is also made possible by the CTCS. Signaling traffic filtering is accomplished with the CTCS based on IP address, network address identifier, or mobile directory number for PTT. Several nodes in the network can be traced simultaneously for PTT and NGVN services.

An example of a CTCS is the Agilent Web IGN App Server. An example of a traffic collection system (TCS) is the Agilent NgN Analysis System. In this example, a TCS has network connectivity to multiple switching systems provided by four span points, one on each of four switches. The Cisco Catalyst 6509 is an example of a switching system. This allows for live call data sampling for improved session analysis. A TCS also has connectivity back to the network core for communication of call data to a CTCS for call analysis and correlation. In an example of the invention, a TCS is capable of collecting SIP, SA to PTT, RADIUS, Mobile IP, and Handset to PTT Edge Proxy traffic from switching systems. The TCS inserts the traffic data into a database and stores the data by call and by customer as a cohesive call. This allows problems in 3G data call completion to be identified, alarmed, and reviewed for trouble shooting on an individual customer basis by a CTCS.

It should be understood that network regions 320, 330, and 340 could be distinct geographic regions. Network regions 320, 330, and 340 could also be distinct types of networks. For example, one region could be a wireless network, whereas another region could be a cable network. It should also be understood that network regions 320, 330, and 340 could be owned or operated by a third party distinct from the operator of CTCS 310. For example, a service provider, such as a telecommunications carrier, could provide voice service to a fast-Ethernet based cable network operator. CTCS 310 would then query a TCS located in the cable network.

FIG. 4 illustrates the operation of CTCS 310 in an embodiment of the invention. To begin, CTCS 310 receives a correlation request for a service session from client device 354 (Step 410). The service session could be, for example, a PTT session between mobile device 325 in network region 320 and mobile device 345 in network region 340. In this case, CTCS 310 would process the correlation request to determine which traffic collection systems are relevant to the request. CTCS 310 processes the correlation request to select TCS 321 and TCS 331 (Step 320) from all three TCSs.

Upon selection of TCS 321 and TCS 341, CTCS 310 generates a collection request and transmits the collection request to TCS 321 and TCS 341 over conventional links (Step 430). A conventional link could be, for example, a fast-Ethernet link. TCS 321 has been monitoring and storing signaling traffic for network region 320. Similarly, TCS 341 has been monitoring and storing signaling traffic for network region 340. TCS 321 therefore receives the collection request from CTCS 310 and processes the collection request to retrieve data for the PTT service session from the stored signaling traffic. TCS 321 then transmits its collection response indicating the PTT data to CTCS 310. TCS 341 also receives the collection request from CTCS 310 and processes the collection request to retrieve data for the PTT service session from its stored signaling traffic. TCS 341 then transmits its collection response indicating the PTT data to CTCS 310.

Next, CTCS 310 receives the collection responses from TCS 321 and TCS 341 (Step 440). The collection responses indicate data for the PTT service session between devices 325 and 345. CTCS 310 then processes the data from TCS 321 and the data from TCS 341 to generate a correlation response for client device 354 (Step 450). Lastly, CTCS 310 transfers the correlation response to client device 354 (Step 460). The correlation response indicates the correlated data from TCS 321 and TCS 341.

In another embodiment, the collection requests transmitted from CTCS 310 to TCS 321 and TCS 341 could indicate a group of users, such as a PTT user group. TCS 321 would then process the collection request to retrieve data for the PTT service session from the stored signaling traffic based on the group. TCS 321 could also process the collection request to retrieve the data for the PTT service session from the stored signaling traffic based on at least a one of the group of users. In such a case, TCS 321 determines which, if any, of devices 325 and 326 belong to the PTT group. In this case, device 325 is a member of the group. TCS 341 could operate in a similar manner as described for TCS 321 with respect to devices 345 and 346.

Data for the PTT service session collected by TCS 321 could contain partial message information for the session. Similarly, data for the PTT service session collected by TCS 341 could contain partial message information for the session. In this case, the partial message information transmitted from both TCS 321 and 341 in combination could comprise full message information for the session. It should be understood that the service session could be for a service other than PTT. For example, the service session could be a video conference session, a multicast video session, or an instant chat session, as well as other types of service sessions.

Advantageously, CTCS 310, in conjunction with TCSs 321, 331, and 341, allows for gathering session information on a call by call basis regardless of the origin or destination of a session. The TCSs are connected to individual network elements and are capable of gathering and storing traffic data and all the attributed protocol information for use as needed to identify and isolate network issues. For example, the collection devices are connected to media gateway controllers, access gateways, signaling gateways, and trunk gateways. CTCS 310 can be used to correlate between multiple collection units (TCSs) installed throughout the network. Thus, traffic data from a session that spans across a packet based network and a circuit switched network can be monitored, stored, correlated, and analyzed.

Figure 5:
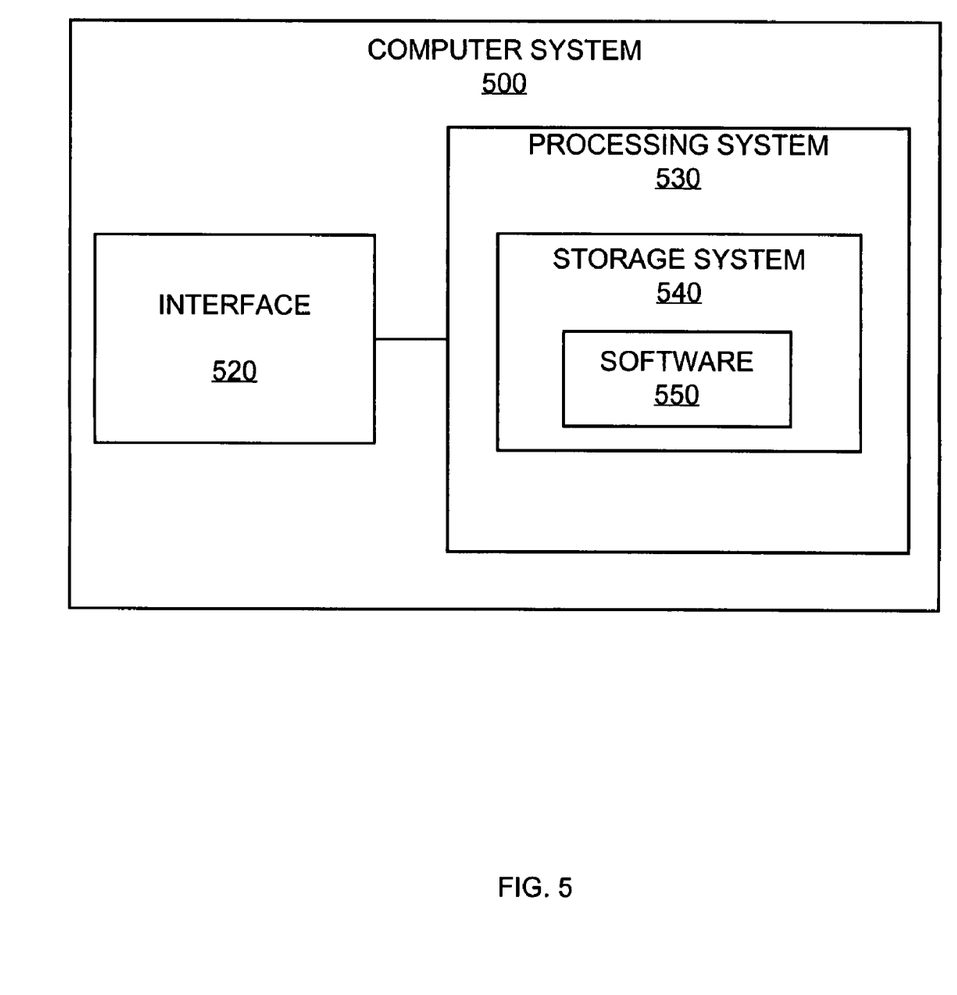
FIG. 5 illustrates a computer system in an embodiment of the invention.

Computer System—FIG. 5

FIG. 5 illustrates computer system 500 in an embodiment of the invention. Computer system 506 includes interface 520, processing system 530, storage system 540, and software 550. Storage system 540 stores software 550. Processing system 530 is linked to interface 520. Computer system 500 could be comprised of a programmed general-purpose computer, although those skilled in the art will appreciate that programmable or special purpose circuitry and equipment may be used. Computer system 500 may use a client server architecture where operations are distributed among a server system and client devices that together comprise elements 520-550.

Interface 520 could comprise a network interface card, modem, port, or some other communication device. Signaling interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for central traffic correlation systems 110 and 310.

What is claimed is:

1. A system for correlating signaling traffic for service sessions in a packet service network, the system comprising:
    a central traffic correlation system (CTCS) configured to receive a correlation request for a first service session from a client device, transmit a collection request for the first service session to a first traffic collection system (TCS) and a second traffic collection system (TCS), receive a first collection response from the first TCS indicating first data for the first service session, receive a second collection response from the second TCS indicating second data for the first service session, and transfer a correlation response to the client device indicating the first and second data;
    the first TCS configured to monitor and store first signaling traffic for a first network region, receive the collection request from the CTCS, process the collection request to retrieve the first data for the first service session from the first signaling traffic, and transmit the first collection response indicating the first data to the CTCS; and
    the CTCS further configured to process the correlation request to select the first TCS and the second TCS and generate the collection request, and process the first data and the second data to generate the correlation response.

2. The system of claim 1 wherein the second TCS is configured to monitor and store second signaling traffic for a second network region, receive the collection request from the CTCS, process the collection request to retrieve the second data for the first service session from the second signaling traffic, and transmit the second collection response indicating the second data to the CTCS.

3. The system of claim 1 wherein the first signaling traffic comprises Session Initiation Protocol (SIP) messaging for the first service session.

4. The system of claim 2 wherein the second signaling traffic comprises Session Initiation Protocol (SIP) messaging for the first service session.

5. The system of claim 1 wherein the first service session comprises a push-to-talk session.

6. The system of claim 1 wherein the collection request indicates a group having a plurality of users.

7. The system of claim 6 wherein the first TCS is configured to process the collection request to retrieve the first data for the first service session from the first signaling traffic based on the group.

8. The system of claim 6 wherein the first TCS is configured to process the collection request to retrieve the first data for the first service session from the first signaling traffic based on at least a one of the plurality of users.

9. The system of claim 1 wherein the first data comprises partial message information for the first session and wherein the second data comprises partial message information for the first session and wherein the first data and the second data in combination comprise full message information for the first session.

10. A method of operating a system for correlating signaling traffic for service sessions in a packet service network, the method comprising:
   in a central traffic correlation system (CTCS), receiving a correlation request for a first service session from a client device;
   in the CTCS, processing the correlation request to select a first traffic collection system (TCS) and a second TCS;
   in the CTCS, generating and transmitting a collection request for the first service session to the first TCS and the second TCS;
   in the first TCS, monitoring and storing first signaling traffic for a first network region, receiving the collection request from the CTCS, processing the collection request to retrieve the first data for the first service session from the first signaling traffic, and transmitting the first collection response indicating the first data to the CTCS;
   in the CTCS, receiving a first collection response from the first TCS indicating first data for the first service session;
   in the CTCS, receiving a second collection response from the second TCS indicating second data for the first service session;
   in the CTCS, processing the first data and the second data to generate a correlation response; and
   in the CTCS, transferring the correlation response to the client device indicating the first and second data.

11. The method of claim 10 wherein the second TCS is configured to monitor and store second signaling traffic for a second network region, receive the collection request from the CTCS, process the collection request to retrieve the second data for the first service session from the second signaling traffic, and transmit the second collection response indicating the second data to the CTCS.

12. The method of claim 10 wherein the first signaling traffic comprises Session Initiation Protocol (SIP) messaging for the first service session.

13. The method of claim 11 wherein the second signaling traffic comprises Session Initiation Protocol (SIP) messaging for the first service session.

14. The method of claim 10 wherein the first service session comprises a push-to-talk session.

15. The method of claim 10 wherein the collection request indicates a group having a plurality of users.

16. The method of claim 15 wherein the first TCS is configured to process the collection request to retrieve the first data for the first service session from the first signaling traffic based on the group.

17. The method of claim 15 wherein the first TCS is configured to process the collection request to retrieve the first data for the first service session from the first signaling traffic based on at least a one of the plurality of users.

18. The method of claim 10 wherein the first data comprises partial message information for the first session and wherein the second data comprises partial message information for the first session and wherein the first data and the second data in combination comprise full message information for the first session.

* * * * *